(12) United States Patent
Tiruvur et al.

(10) Patent No.: US 9,992,043 B2
(45) Date of Patent: *Jun. 5, 2018

(54) FEC CODING IDENTIFICATION

(71) Applicant: INPHI CORPORATION, Santa Clara, CA (US)

(72) Inventors: Arun Tiruvur, San Jose, CA (US); Sudeep Bhoja, San Jose, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/476,323

(22) Filed: Mar. 31, 2017

(65) Prior Publication Data
US 2017/0207933 A1 Jul. 20, 2017

Related U.S. Application Data

(63) Continuation of application No. 14/536,303, filed on Nov. 7, 2014, now Pat. No. 9,647,799.

(51) Int. Cl.
| | |
|---|---|
| *H04B 1/38* | (2015.01) |
| *H04L 5/16* | (2006.01) |
| *H04L 25/03* | (2006.01) |
| *H04L 27/04* | (2006.01) |
| *H04L 1/00* | (2006.01) |

(52) U.S. Cl.
CPC ............ *H04L 25/03* (2013.01); *H04L 1/0061* (2013.01); *H04L 27/04* (2013.01)

(58) Field of Classification Search
CPC ....... H04L 25/03; H04L 27/04; H04L 1/0061; H04L 45/74; H04L 12/5601; H04Q 11/0062; H04Q 2011/0088; H03M 13/1102; H03M 13/356

USPC ....... 375/219, 220, 222, 261, 264, 262, 265, 375/369, 353; 370/329; 714/748, 758
See application file for complete search history.

(56) References Cited

U.S. PATENT DOCUMENTS

| | | | |
|---|---|---|---|
| 9,647,799 B2 * | 5/2017 | Tiruvur | ........ H04L 1/0061 |
| 2002/0078408 A1 | 6/2002 | Chambers et al. | |
| 2006/0262227 A1 * | 11/2006 | Jeong | ........ H04H 20/71 348/723 |
| 2006/0294443 A1 | 12/2006 | Fekih-Romdhane | |
| 2008/0069570 A1 | 3/2008 | Dallesasse | |
| 2012/0148242 A1 | 6/2012 | Chen et al. | |

(Continued)

FOREIGN PATENT DOCUMENTS

KR   10-2010-0134046 A   12/2010

OTHER PUBLICATIONS

Office Action for U.S. Appl. No. 13/797,814, dated Apr. 3, 2014.
(Continued)

*Primary Examiner* — Phuong Phu
(74) *Attorney, Agent, or Firm* — Richard T. Ogawa; Ogawa P.C.

(57) ABSTRACT

The present invention is directed to data communication systems and methods. More specifically, embodiments of the present invention provide techniques for transceivers to quickly identify FEC mode used in data communication. A transmitting transceiver embeds FEC mode information in a designated field of an alignment marker. The receiving transceiver acknowledges the receipt of the FEC mode information and processes the incoming data accordingly. There are other embodiments as well.

20 Claims, 8 Drawing Sheets

(56) References Cited

U.S. PATENT DOCUMENTS

| | | | |
|---|---|---|---|
| 2012/0250679 A1 | 10/2012 | Judge et al. | |
| 2014/0341118 A1* | 11/2014 | Lee | H04L 45/74 370/329 |
| 2015/0138999 A1* | 5/2015 | Avudainayagam | H04L 1/1607 370/252 |
| 2016/0080192 A1* | 3/2016 | Stadelmeier | H03M 13/356 375/298 |

OTHER PUBLICATIONS

James F. Buckwalter et al., "A Monolithic 25-Gb/s Transceiver With Photonic Ring Modulators and Ge Detectors in a 130-nm CMOS SOI Process", IEEE Journal of Solid-State Circuits, Jun. 2012, pp. 1309-1322, vol. 47, No. 6.

International Search Report and Written Opinion for PCT/US2014/021436, filed Mar. 6, 2014.

* cited by examiner

FEC CODING IDENTIFICATION

CROSS-REFERENCES TO RELATED APPLICATIONS

This patent application is a continuation of and claims priority to U.S. application Ser. No. 14/536,303 filed Nov. 7, 2014, which is related to U.S. patent application Ser. No. 13/791,201, filed on Mar. 8, 2013, titled "OPTICAL COMMUNICATION INTERFACE UTILIZING CODED PULSE AMPLITUDE MODULATION", which claims priority from U.S. Provisional Patent Application No. 61/714,543, filed on Oct. 16, 2012, titled "100G PA CODED MODULATION", and U.S. Provisional Patent Application No. 61/699,724, filed on Sep. 11, 2012, titled "ADAPTIVE ECC FOR FLASH MEMORY", all of which are incorporated by reference herein for all purposes.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to data communication systems and methods.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Over the past, there have been many types of communication systems and methods. Unfortunately, they have been inadequate for various applications. Therefore, improved communication systems and methods are desired.

BRIEF SUMMARY OF THE INVENTION

The present invention is directed to data communication systems and methods. More specifically, embodiments of the present invention provide techniques for transceivers to quickly identify FEC mode used in data communication. A transmitting transceiver embeds FEC mode information in a designed field of an alignment marker. The receiving transceiver acknowledges the receipt of the FEC mode information and processes the incoming data accordingly. There are other embodiments as well.

According to an embodiment, the present invention provides a system for providing coding identification. The system includes a first transceiver that has a first alignment module, a first FEC module, and a pattern generator. The first transceiver is configured to generate at least a first data stream and a plurality of alignment markers. The plurality of alignment markers includes a first alignment marker and a second alignment marker. The first alignment marker includes a device message and an FEC mode message. The system also includes a second transceiver comprising a second alignment module and a second FEC module. The second transceiver is configured to process the plurality of alignment markers and the first data stream. The first FEC module encodes the first data stream using a first FEC mode. The FEC mode message indicates the first FEC mode. The second transceiver determines the first FEC mode from the second alignment marker. The second transceiver processes the first data stream using the first FEC mode.

According to another embodiment, the present invention provides a transceiver device. The device includes an input interface for processing incoming data from a plurality of channels. The device also includes an alignment module for generating a first data stream based on the incoming data received from the plurality of channels. The first data stream is separated by a plurality of alignment markers. The first plurality of alignment markers includes a first alignment marker and a second alignment marker. The device also includes an FEC module being configured to encode the first data stream in a first FEC mode. The device additionally includes a processing module configured to generate a second data stream and to embed a first device message in the first alignment marker and a first FEC mode message in the second alignment marker. The device further includes an output interface for transmitting the first data stream and the plurality of alignment markers to a receiving entity.

According to another embodiment, the present invention provides a transceiver device. The device includes an input data communication interface for receiving an analog data stream from a transmitting entity. The device also includes an ADC module for converting the analog data stream to a data stream and a plurality of alignment markers. The plurality of alignment markers includes a first alignment markers and a second alignment marker. The device also includes a processing module for determining an FEC mode by processing a device message embedded at the first alignment marker and a first FEC mode message storage. The method also includes an FEC module for processing the data stream in accordance with the first FEC mode.

It is to be appreciated that embodiments of the present invention provide many advantages over conventional techniques. With conventional techniques, determining FEC mode can be a time-consuming and inefficient process, as the receiving entity may need to try multiple FEC modes before determining which to use for decoding incoming data streams. According to various embodiments of the present invention, by using existing alignment markers to indicate FEC mode, transceivers can quickly establish a mode of communication, and thus operate efficiently. It is also to be appreciated that alignment markers is standardized and used in existing systems. By using a predefined field or region of alignment markers, systems and methods of the present invention are backward compatible with existing systems and processes. Depending on the specific implementation, embodiments of the present invention can be incorporated into existing or new systems. There are other embodiments as well.

DETAILED DESCRIPTION OF THE INVENTION

The present invention is directed to data communication systems and methods. More specifically, embodiments of the present invention provide techniques for transceivers to quickly identify FEC mode used in data communication. A transmitting transceiver embeds FEC mode information in a designated field of an alignment marker. The receiving transceiver acknowledges the receipt of the FEC mode information and processes the incoming data accordingly. There are other embodiments as well.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

As an example, leaf-spine architecture has been used for moving and sharing a large amount of data. More specifically, leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM-8, PAM-12, PAM-16, etc.) in leaf-spine architecture that allows large amount (up terabytes of data at the spine level) of data to be transferred via optical network. It is to be appreciated that while embodiments of the present invention can be used in leaf-spine architectures, they are not limited to leaf-spine architectures and can be used in a wide variety of applications. For example, embodiments of the present invention can be used in different types of data communication networks that are capable of operating in different FEC modes.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. Section 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
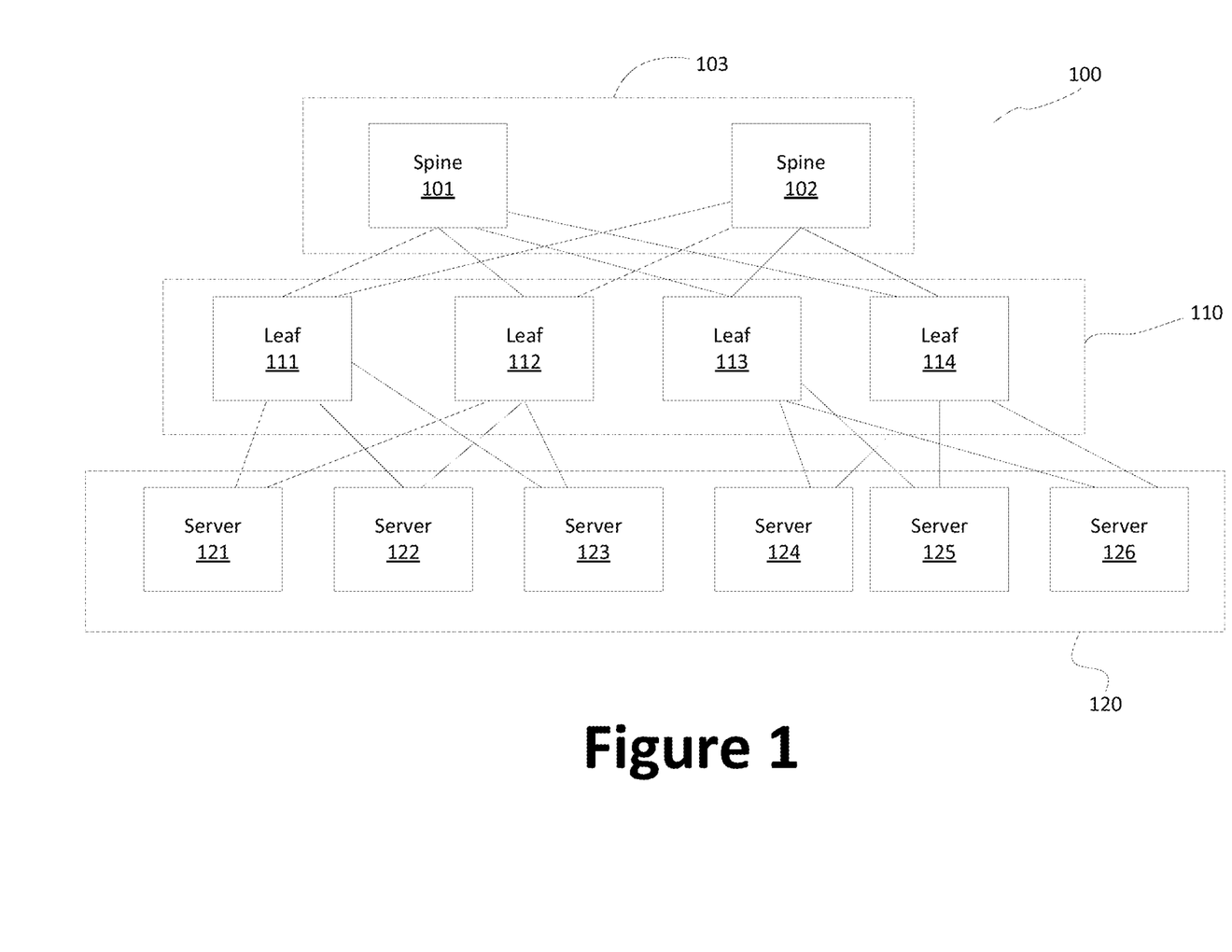
FIG. 1 is a simplified diagram illustrating a leaf-spine architecture 100 according to an embodiment of the present invention.

FIG. 1 is a simplified diagram illustrating a leaf-spine architecture 100. This diagram is merely an example, which should not unduly limit the scope of the claims. One of ordinary skill in the art would recognize many variations, alternatives, and modifications. The leaf-spine architecture 100 is an exemplary set up where the FEC coding identification mechanisms according to embodiments of the present invention can be used, but it is understood that the FEC coding identification mechanisms can be used in other applications as well, where two or more servers are capable of operating in more than one FEC coding modes.

The leaf-spine architecture 100 comprises servers 120, leaf switches 110, and spine switches 103. It is to be appreciated that depending on the need and specific application, the number and arrangement of the servers and switches may be changed. As shown in FIG. 1, each server may be connected to more than one leaf switch. For example, server 121 is connected to leaf switches 111 and 112. Similarly, server 122 is connected to leaf switches 111 and 112, and so is server 123. In an exemplary embodiment, server 121 is connected to the leaf switch 111 via optical communication link utilizing pulse amplitude modulation (PAM). PAM-2, PAM-4, PAM-8, PAM-12, PAM-16, and/or other variations of PAM may also be used in conjunction with optical communication links in various embodiments of the present invention. The bandwidth of the optical communication link between the server 121 and leaf switch 111 can be over 10 gigabits/s. Each leaf switch, such as leaf switch 111, may be connected to 10 or more servers. In one implementation, a leaf switch has a bandwidth of at least 100 gigabits/s. For example, 100 gigabits/s can be provided using four 25 gigabits/s lines.

In a specific embodiment, a leaf switch comprises a receiver device configured to receive four communication channels, and each of the channels is capable of transferring incoming data at 25 gigabits/s and configured as a PAM-2 format. Similarly, a server (e.g. server 121) comprises a communication interface that is configured to transmit and receive at 100 gigabits/sec (e.g., four channels at 25 gigabits/s per channel), and is compatible with the communication interface of the leaf switches. The spine switches, similarly, comprise communication interfaces for transmitting and receiving data in PAM format. The spine switches may have a large number of communication channels to accommodate a large number of leaf switches, each of which provides switching for a large number of servers.

The leaf switches are connected to spine switches. As shown in FIG. 1, each leaf switch is connected to spine switches 101 and 102. For example, leaf switch 111 is connected to the spine switch 101 and 102, and so are leaf switches 113 and 114. In a specific embodiment, each of the spine switches is configured with a bandwidth of 3.2 terabytes/s, which is big enough to communicate 32 optical communication links at 100 gigabits/s each. Depending on the specific implementation, other configurations and bandwidth are possible as well.

The servers, through the architecture 100 shown in FIG. 1, can communicate with one another efficiently with a high bandwidth. Optical communication links are used between servers and leaf switches, and also between leaf switches and spine switches, and PAM utilized for optical network communication.

When servers shown in FIG. 1 communicate with one another, forward error correction (FEC) mechanism is used to ensure the data integrity. Depending on the specific implementation, various types of FEC mode can be used. For example, there are number of encode modes, such as Reed-Solomon (RS) coding, Golay, BCH, Multidimensional parity, Hamming codes, and others. The servers as shown in FIG. 1 can be configured to use one or more coding modes. According to embodiments of the present invention, a server send an FEC mode message to another server to quickly establish the common FEC mode that the two server use. More details of communicating FEC modes are provided below. For example, server 121 uses BCH code in performing FEC, and server 122 uses RS code in performing FEC. By using predetermined regions of alignment markers, server 121 can easily inform server 122 to switch the FEC mode from RS code to BCH code.

Figure 2:
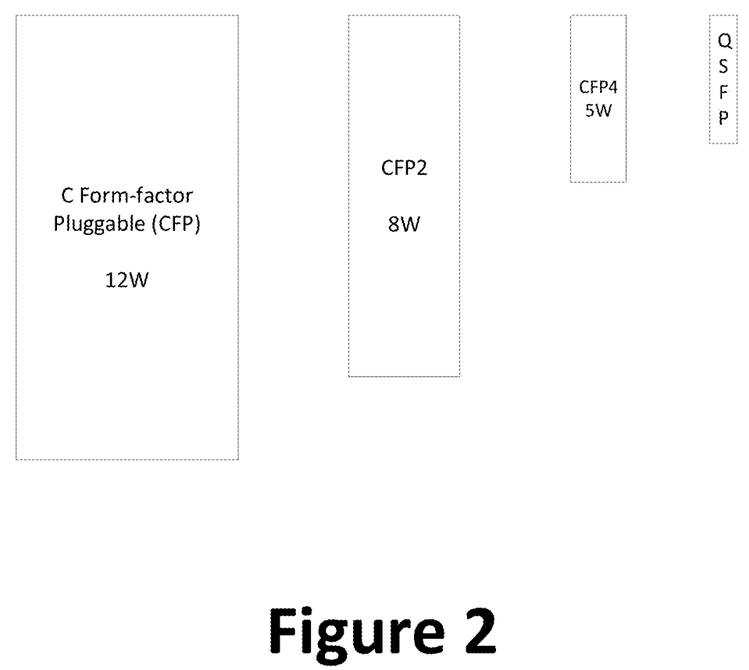
FIG. 2 is a simplified diagram illustrating the form factor of a communication device according to an embodiment of the present invention.

It is to be appreciated that the PAM communication interfaces described above can be implemented in accordance with today communication standards form factors. In addition, afforded by high efficiency level, network transceivers according to embodiments of the present invention can have much lower power consumption and smaller form factor compared to conventional devices. FIG. 2 is a simplified diagram illustrating the form factor of a communication device. Today, C form-factor pluggable (CFP) standard is widely adapted for gigabit network systems. Conventional electrical-connection based CFP transceivers often use 10×10 gigabits/s lines to achieve high bandwidth. With optical connection, CFP transceivers can utilize 10×10 gigabits/s configuration, 4×25 gigabits/s configuration, or others. It is to be appreciated that by utilizing optical communication link and PAM format, a transceiver according to the present invention can have a much smaller form factor than CFP and CFP2 as shown. In various embodiments, communication interfaces according to the invention can have a form factor of CFP4 or QSFP, which are much smaller in size than the CFP. In addition to smaller form factors, the power consumption of communication interfaces according to the present invention can be much smaller. In a specific embodiment, with the form factor of QSFP, the power consumption can be as low as about 3 W, which is about ¼ that of convention transceivers with CFP form factor. The reduce level of power consumption helps save energy at data centers, where thousands (sometimes millions) of these communication devices are deployed.

Figure 3A:
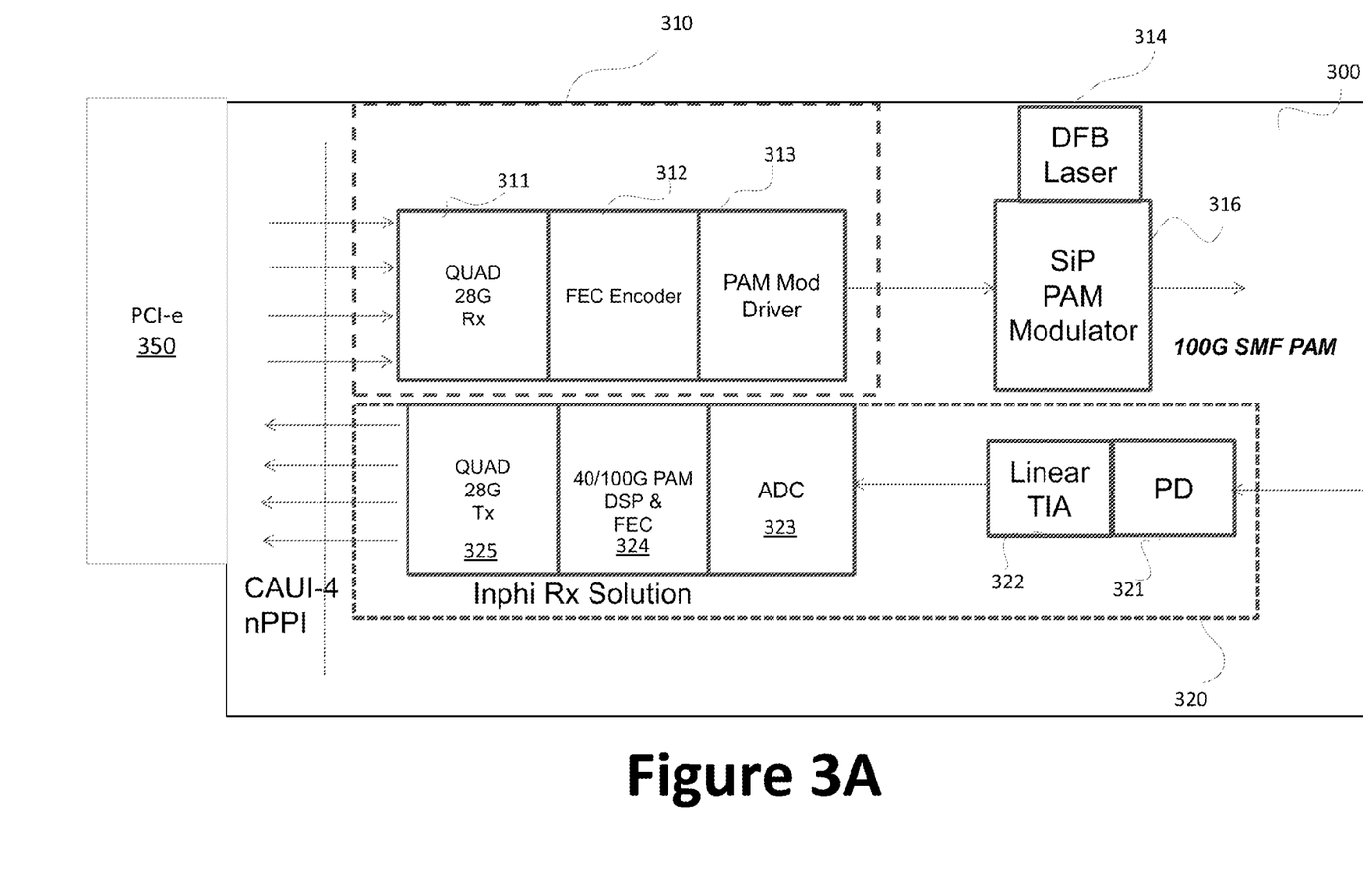
FIG. 3A is a simplified diagram illustrating a communication interface 300 according to an embodiment of the present invention.

FIG. 3A is a simplified diagram illustrating a communication interface 300 according to an embodiment of the present invention. This diagram is merely an example, which should not unduly limit the scope of the claims. One of ordinary skill in the art would recognize many variations, alternatives, and modifications. The communication interface 300 can be used in a variety of applications, such as servers and leaf switches shown in FIG. 1, and other types of communication devices. As an example, the communication interface 300 is a part of a transceiver (XCVR), which is used for both transmitting and receiving data. The communication interface 300 includes transmitter module 310 and a receiver module 320. The transmitter module 310 comprises a receiver 311, encoder 312, and PAM modulation driver 313.

In an embodiment, the communication interface 300 is configured to receive incoming data at through four channels, where each channel is configured at 25 gigabits/s and configured as a PAM-2 format. Using the transmitter module 310, modulator 316, and the laser 314, the communication interface 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter module 310 receives 4 channels of data. It is to be appreciated that other variants of pulse-amplitude modulation (e.g., PAM-4, PAM-8, PAM-12, PAM-16, etc.), in addition to PAM-2 format, may be used as well. The transmitter module 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface 350. For example, the interface 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data. For example, with four channels of data at 25 gigabits/s coming in, a total bandwidth of 100 gigabits/s is processed by the functional block 311, which acts a switch for processing data. More specifically, the data received by the receiver 311 are aligned into a single stream of data, and the alignment is indicated by alignment markers inserted during the serialization process.

The transmitter module 310 further comprises an encoder 312. As shown in FIG. 3, the encoder 312 comprises a forward error correction (FEC) encoder. Among other things, the encoder 312 provides error detection and/or correction as needed. For example, the data received is in a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format. The PAM formats as used in the embodiments of the present invention are further described below.

Depending on the specific implementation, the encoder 312 may utilize one or more FEC encoding modes, such as BCH, variations of RS encoding, and others. When a specific FEC mode (e.g., BCH, RS) is used for encoding outgoing data, the receiving end needs to uses the same FEC mode to process the incoming data. One way to determine the FEC mode is to try different FEC modes to see which works, which can be an inefficient process. It is to be appreciated that according to embodiments of the present invention, the outgoing data stream includes information for FEC mode, and the receiving entity can quickly determine the FEC mode by simply processing the incoming data containing FEC mode information. For example, the FEC mode information is embedded at a predetermined region (e.g., BIP field) of alignment markers and it transmitted as a part of outgoing data stream. The receiving entity processes the FEC mode information and sends an acknowledge message to the transmitting entity. For example, when the communication interface 300 functions as receiving entity, the FEC processors 324 determines the FEC mode by processing the corresponding field(s) of incoming data stream.

The PAM modulation driver 313 is configured to drive data stream encoded by the encoder 312. In various embodiments, the receiver 311, encoder 312, and the modulation driver 313 are integrated and part of the transmitter module 310.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM-12, PAM-16, etc.). In various embodiments, the laser 314 comprises a distributed feedback (DFB) laser. Depending on the application, other types of laser technology may be used as well, as such vertical cavity surface emitting laser (VCSEL) and others.

Figure 3B:
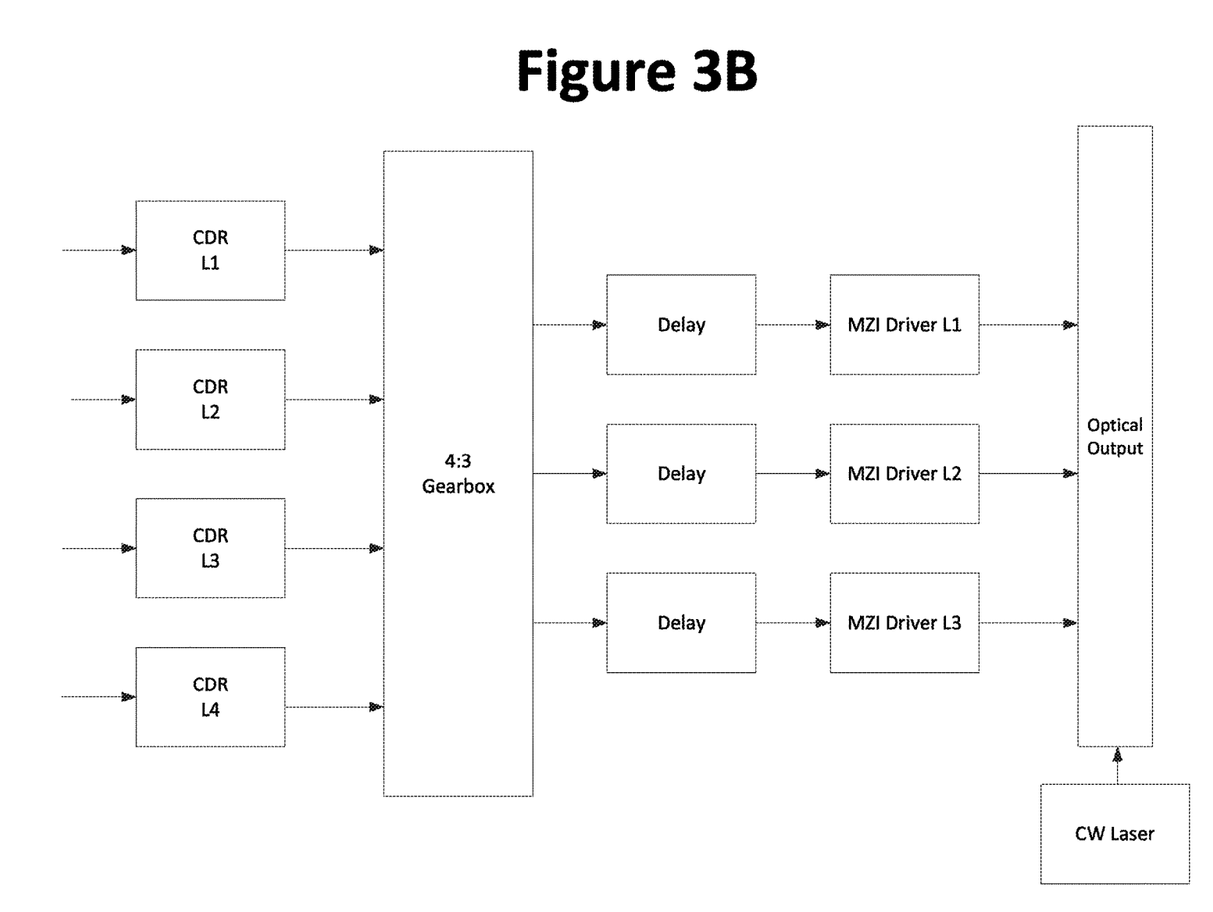
FIG. 3B is a simplified diagram illustrating a segmented optical modulator according to an embodiment of the present invention.

FIG. 3B is a simplified diagram illustrating a segmented optical modulator according to an embodiment of the present invention. This diagram is merely an example, which should not unduly limit the scope of the claims. One of ordinary skill in the art would recognize many variations, alternatives, and modifications. For example, modulated PAM signals modulated for transmission over optical communication links.

Now referring back to FIG. 3A. The communication interface 300 is configured for both receiving and transmitting signals. A receiver module 320 comprise a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100 Gb/s, and at block 324 four data streams in PAM-2 format is generated at a bandwidth of 25 Gb/s. The four data streams are transmitted by the transmitter 325 over 4 communication channels at 25 Gb/s. Among other features, the block 324 provides FEC function, and the FEC mode can determined by processing FEC mode information stored at incoming data stream.

It is to be appreciated that there can be many variations to the embodiments described in FIG. 3. For example, different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

Figure 4:
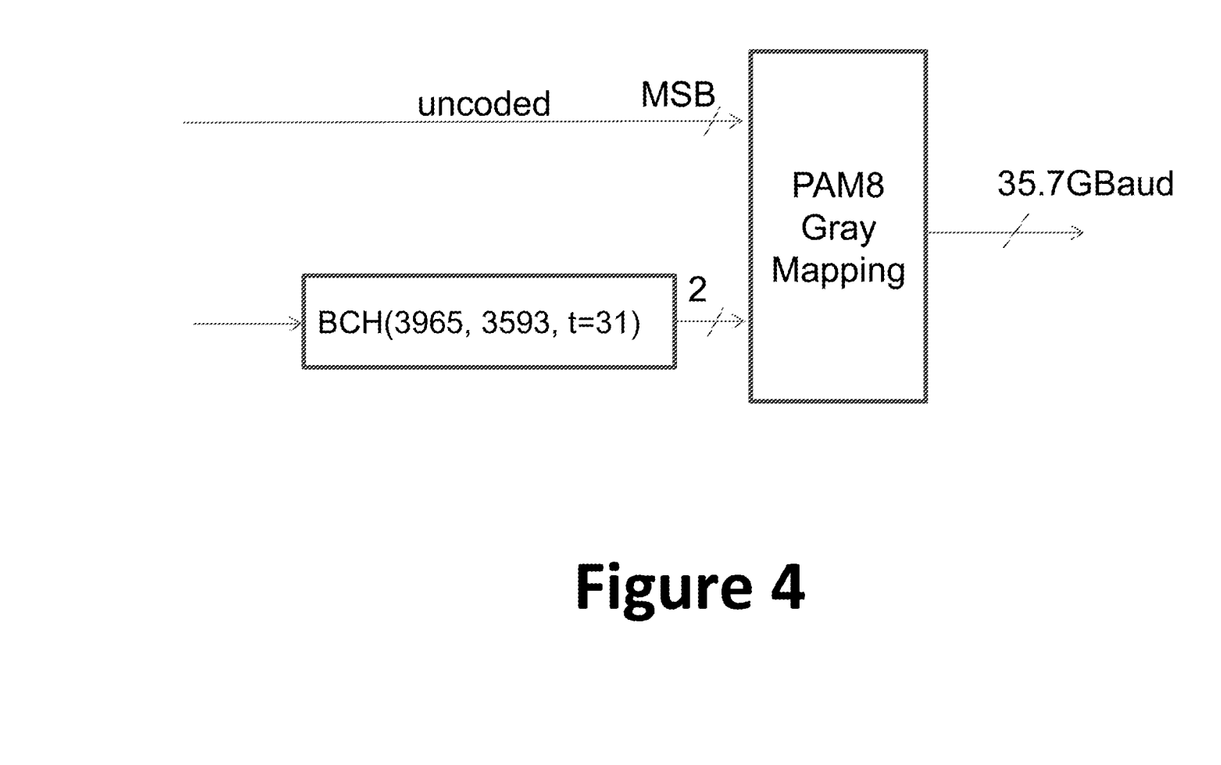
FIG. 4 is a simplified diagram illustrating a PAM-8 format according to an embodiment of the invention.

The PAM modulation can be implemented in various ways. FIG. 4 is a simplified diagram illustrating a PAM-8 format according to an embodiment of the invention. This diagram is merely an example, which should not unduly limit the scope of the claims. One of ordinary skill in the art would recognize many variations, alternatives, and modifications. As shown in FIG. 4, BCH code and uncoded data (most significant bit) are mapped by PAM-8 Gray mapping. For example, the mapping is provided by a symbol generator. The outgoing data stream includes both payload data and alignment markers. One or more of the alignment markers comprise data field that indicates the FEC mode.

Figure 5:
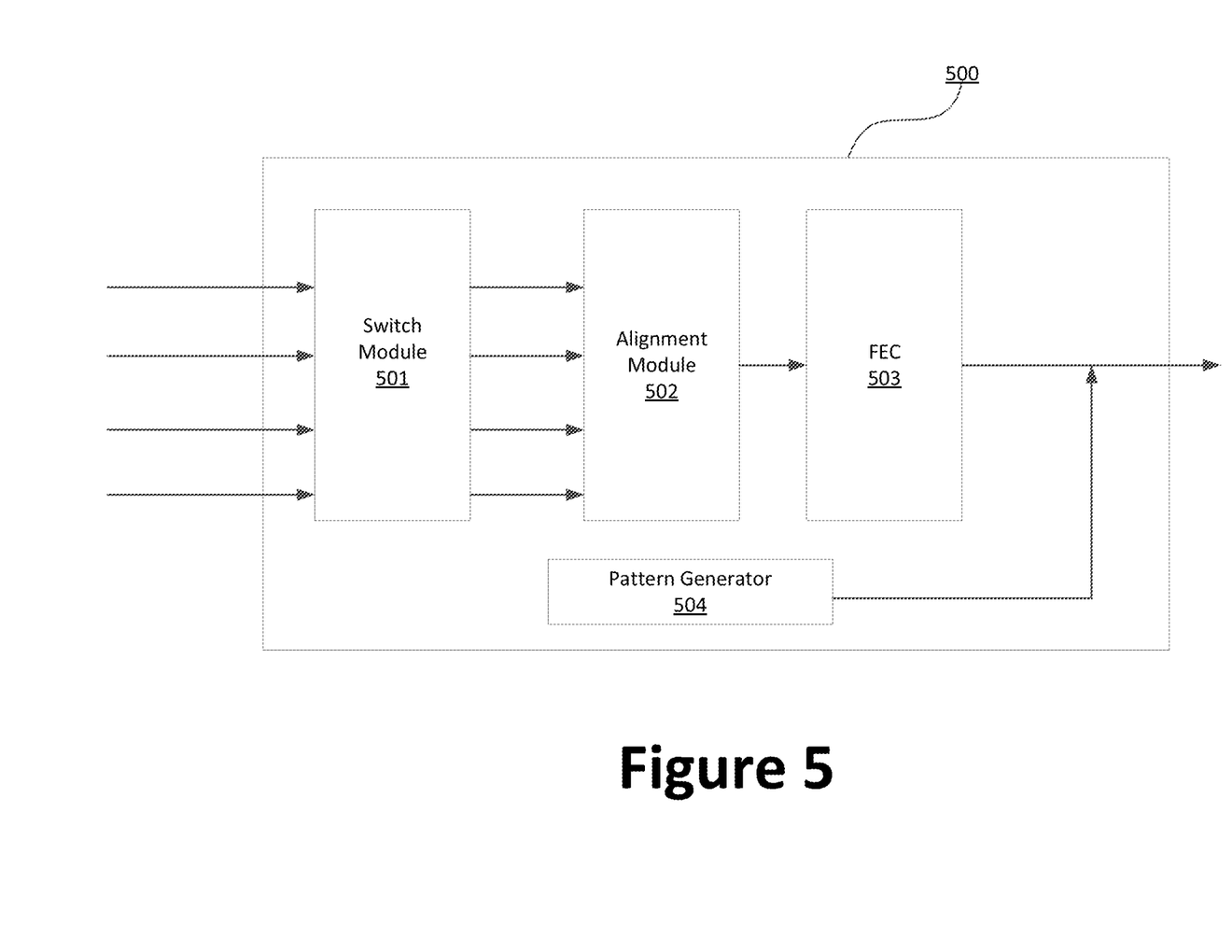
FIG. 5 is a simplified diagram illustrating a transceiver device 500 that provides FEC mode identification according to embodiments of the present invention.

FIG. 5 is a simplified diagram illustrating a transceiver device 500 that provides FEC mode identification according to embodiments of the present invention. This diagram is merely an example, which should not unduly limit the scope of the claims. One of ordinary skill in the art would recognize many variations, alternatives, and modifications. For example, the transceiver device 500 is implemented in accordance with the communication interface 300.

The transceiver device 500 comprises a switch module 501, an alignment module 502, an FEC module 503, and a pattern generator 504. As shown, the switch module 501 receives four channels of data input. For example, each channel is configured at 25 gigabits/s bandwidth, and operating at 4×25 gigabits/s, the switch module 501 operates effectively at a bandwidth of 100 gigabits/s. It is to be appreciated that while the switch module 501 and the alignment module 502 are shown to process four channels of data, other configurations are possible as well. For example, the transceiver device 500 may additionally operate in 2× (two channels) mode, 8× (eight channels) mode, or others. The alignment module 502 aligns the incoming data received by the switch module 501 and generates a data stream. For example, alignment module 502 comprises a MUX module that processes incoming data one channel at a time. The data stream including data received from the four data channels. The FEC module 503 encodes the data stream to provide a serialized data stream. Depending on the implementation, an FEC mode (e.g., BCH, RS, etc.) is used to encode the data stream. To make sure the receiving entity uses correct FEC mode when processing the data stream, the serialized data stream includes FEC mode information. The encoded data stream is also serialized for data transmission. For example, a SerDes module is used to serialize incoming data. The pattern generator 504 maps or converts the data stream into a stream of symbols. For example, in accordance with communication standards (e.g., PAM), the serialized outgoing data stream comprises both data payloads and alignment markers. For example, alignment markers are standardized by one or more standard organizations, such as IEEE, and they help properly align serialized data. According to certain communication standards, the alignment markers are 64 (or 66) bits in length and positioned between payload data. Each of the alignment markers includes predefined data fields, such as sync header, lane designator, Bit Interleaved Parity (BIP) field, identifier.

Figure 6:
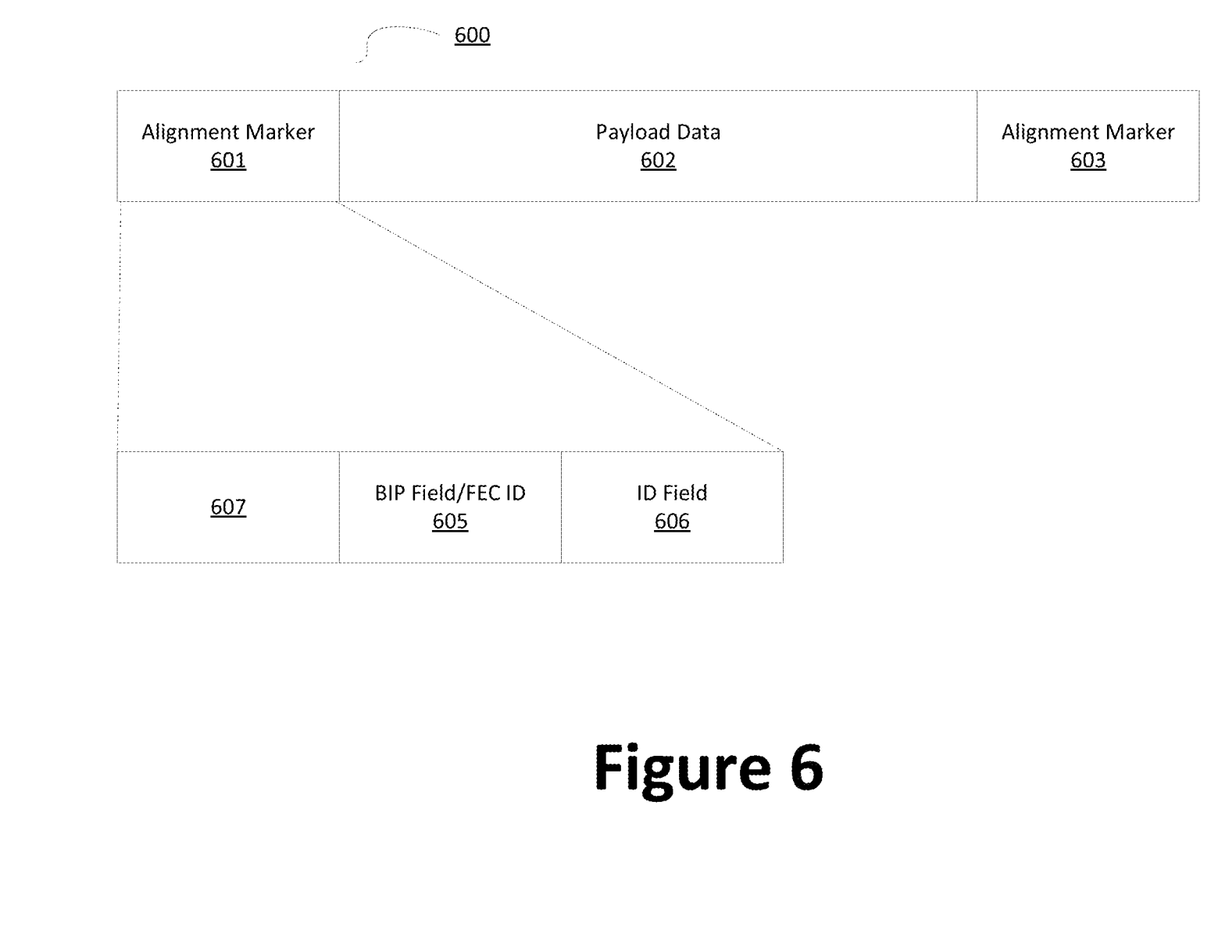
FIG. 6 is a simplified diagram illustrating a data stream 600 according to an embodiment of the present invention.

FIG. 6 is a simplified diagram illustrating a data stream 600 according to an embodiment of the present invention. This diagram is merely an example, which should not unduly limit the scope of the claims. One of ordinary skill in the art would recognize many variations, alternatives, and modifications. The data stream 600, as mentioned above, includes payload data 602 positioned between alignment marker 601 and alignment marker 602. The alignment markers are inserted into the data stream at regular intervals. For example, a specific communication standard dictates that 16383 66-bits blocks of data are to be inserted between two alignment markers, and the BIP of is calculated across all 16383 blocks and the preceding alignment marker block. For example, the alignment marker 601 comprises a 64-bits block that is inserted into data stream. For example, the alignment marker 601 corresponds the payload data 602, which is encoded with a specific FEC mode, to a data communication lane (e.g., PCS lane, 25 gigabits/s data stream, etc.). According to various embodiments, the alignment markers 601 and 602 do not pass through the line coding mechanism (e.g., FEC encoding) themselves, and so the markers themselves are formatted specifically to be balanced. A simplified view of the alignment marker 601 comprises region 605, region 606, and region 607. For example, the region 607 comprises one or more lane designators and data headers associated with the payload data 602. The region 606 comprises ID field that is shown to be positioned at the end of the alignment marker, but it is to be appreciated that the ID field can be rearranged to a different position. According to various embodiments, region 605 is 8-bits in size and is configured in compliance with existing communication protocols.

The region 605 corresponds to a BIP field as defined according to various communication standards. For example, the Bit Interleaved Parity (BIP) contain a parity check calculated over the bits from the previously inserted alignment marker and all the subsequently transmitted blocks up to the current marker. According to embodiments of the present invention, data communication does need the BIP field, and BIP field (i.e., region 605) is used to store FEC mode information. More specifically, region 605 stores message indicating (1) that the transceiver device is a specific device that uses region 605 to store FEC mode information, and (2) the specific FEC mode used to encoding the data stream.

It is to be appreciated that the use of BIP field for FEC mode information is used by transceivers that are specifically configured to process the FEC mode information. Therefore, the transceiver of the receiving entity is specifically configured to process the BIP field of incoming alignment markers for the purpose of determining FEC mode and sends an acknowledge message to the transmitting entity to indicate that the FEC mode information is received and the two entity can now communicate using the same FEC mode.

Figure 7:
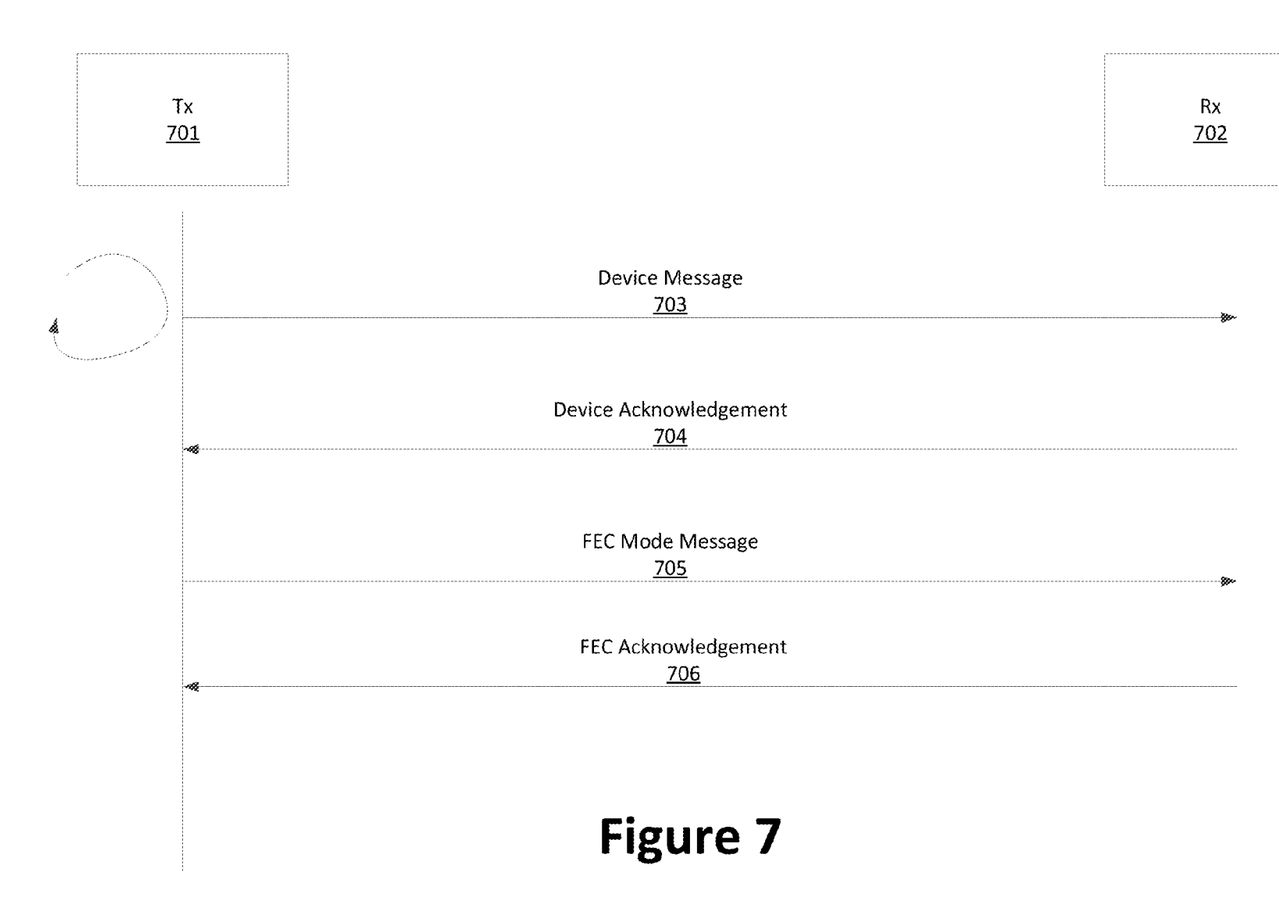
FIG. 7 is a simplified timing diagram illustrating a process for sharing FEC mode information according to embodiments of the present invention.

FIG. 7 is a simplified timing diagram illustrating a process for sharing FEC mode information according to embodiments of the present invention. This diagram is merely an example, which should not unduly limit the scope of the claims. One of ordinary skill in the art would recognize many variations, alternatives, and modifications. For example, one or more steps illustrated in FIG. 6 may be added, removed, combined, modified, replaced, rearranged, and/or overlapped, and should not unduly limit the scope of the claims.

The sharing of FEC mode information and establishing a common FEC mode are provide between the transceiver 701 and transceiver 702. For the purpose of illustration, the transceiver 701 functions as the transmitting entity, and the transceiver 702 functions as the receiving entity, but it is understood that both transceivers are capable of transmitting and receiving data stream.

At step 703, the transceiver 701 sends a device message to the transceiver 702. The device message is embedded in the BIP field(s) of the alignment markers, as described above. The device message is to indicate that the transceiver 701 is a manufacture-specific device that uses the BIP field in the alignment marker to indicate the FEC mode. For example, the transceiver 701 is manufactured by INPHI™ and is configured to use the BIP field of alignment markers to communicate FEC mode information. The device message is received and processed by the transceiver 702. Depending on the make and configuration of the transceiver 702, the transceiver 702 may or may not understand the device message embedded in the BIP field. For example, if the transceiver 702 does not understand the device message and processes the message embedded in the BIP field as parity information, the transceiver 702 may simply ignore the device message.

According to various embodiments, the transceiver 701 is configured to send device message to the transceiver 702 a number of times if an acknowledgement message is not received by the transceiver 702 within a predetermined period of time. For example, not receiving the acknowledgement message may be due to poor network connection or the inability of the transceiver 702 to process the device message in the BIP field. By repeatedly sending device messages to the transceiver 702, the device 701 ensures that the reason for not receiving acknowledgement message from the transceiver 702 is due to device incompatibility (e.g., transceiver 702 not configured to process the BIP field), not due to poor communication link. For example, if the transceiver 701 does not receive the acknowledgement message from the transceiver 702 within the predetermine period of time, the transceiver 701 stops embedding device message and/or FEC mode information in the BIP field. In a specific embodiment, once the transceiver 701 determines that the transceiver 702 is not configured to process device message or FEC mode information embedded in the BIP field, the transceiver 701 runs in a compatibility mode and set the BIP field according to parity of the data stream, or simply initializes the BIP field with zeroes.

At step 704, the transceiver 702 transmits an acknowledgement message to the transceiver 701. Among other features, the device acknowledgement message indicates that the transceiver 702 is configured to process device message and FEC mode information embedded in the BIP field. Depending on the implementation, the acknowledge message can be transmitted as a discrete acknowledgement message, or embedded a predetermined region of an alignment marker.

Upon receiving the acknowledgement message from the transceiver 702, the transceiver 701 sends an FEC mode message to the transceiver 702 at step 705. The FEC mode message indicates the type of FEC encoding used by the transceiver 701 to perform forward error correction. As illustrated in FIG. 6, the FEC mode message is embedded in the field 605, which is previously defined as the BIP field, but used as FEC mode field according to embodiments of the present invention. In various implementations, the transceiver 701 may send the FEC mode message to the transceiver 702 multiple times to make sure that the FEC mode message is received by the transceiver 702. In certain embodiments, the transceiver 701 embeds FEC mode information in each alignment marker, which corresponds to the subsequent data stream. For example, if the transceiver 701 changes the FEC mode used (e.g., changing from BCH to RS), the transceiver 701 may simply indicate the change by providing the new FEC mode information in the corresponding BIP field.

Upon receiving the FEC mode message, the transceiver 702 sends an FEC acknowledgement message to the transceiver 701, at step 706. In addition, the transceiver 702 processes the data stream received from the transceiver 701 using the FEC mode indicated by the 701. For example, the transceiver 702 comprises an FEC processing module that is capable of processing different FEC data modes. Based on the FEC mode indicated by the transceiver 701, the transceiver 702 can switch from one FEC mode to another as needed. In certain embodiments, the transceiver 702 is in communication with multiple transceivers, and is capable to switch from on FEC mode to another as needed.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A transceiver device comprising:
a switching module for receiving incoming data streams from two or more communication lanes;
an alignment module configured to align the incoming data streams and generate an aligned data stream; and
an FEC module configured to encode the aligned data stream and generate an encoded data stream, the encoded data stream comprising a first alignment marker, the first alignment marker comprising a first region storing a first device message and second region storing an FEC mode message and a third region;
wherein:
the encoded data stream is encoded using a first FEC mode;
the FEC mode message indicates the first FEC mode;
the transceiver device sends the encoded data stream to a receiving entity;
the transceiver device determines device compatibility and embeds a second device message in a second alignment marker if an acknowledgment message is not received from the receiving entity within a predetermined period of time.

2. The device of claim 1 wherein the encoded data stream comprises a plurality of alignment markers.

3. The device of claim 1 wherein the receiving entity is configured to process the encoded data stream using the first FEC mode.

4. The device of claim 1 wherein the first FEC mode is associated with BCH code or RS code.

5. The device of claim 1 wherein the transceiver device determines compatibility of the receiving entity based on whether the acknowledgment message is received within the predetermined period of time.

6. The transceiver device of claim 1 wherein the receiving entity sends an acknowledgement message to the first transceiver upon receiving the first alignment marker.

7. The transceiver device of claim 1 wherein the receiving entity processes a second data stream using a second FEC mode in response to receiving a second alignment marker.

8. The transceiver device of claim 1 further comprising a PAM modulator.

9. A transceiver device comprising:
an input data communication interface for receiving an analog data stream from a transmitting entity;
an ADC module for converting the analog data stream to a data stream and a plurality of alignment markers, the plurality of alignment markers including a first alignment markers and a second alignment marker;
a processing module for determining first FEC mode by processing a device message embedded at the first alignment marker and a first FEC mode message; and
an FEC module for processing the data stream in accordance with the first FEC mode;
wherein the transceiver device determines device compatibility and sends an acknowledgment message to the transmitting entity within the predetermine period of time to confirm the first FEC mode.

10. The device of claim 9 wherein the FEC module is configured to processing the data stream in accordance with a second FEC mode in response to receiving a second FEC mode message embedded in a second alignment marker.

11. The device of claim 9 wherein the processing module is configured to generate the acknowledgement message for the transmitting entity in response to receiving the first FEC mode message.

12. A method of data communication, the method comprising:
receiving a plurality of incoming data streams;
aligning the plurality of incoming data streams;
generating an aligned data stream;
encoding the aligned data stream to generate a first encoded data stream using a first FEC mode;
embedding a first alignment marker in the first encoded data stream, the first alignment marker comprising a first region storing a first device message and second region storing an FEC mode message, the FEC mode message indicating the first FEC mode;
transmitting the first encoded data stream to a receiving entity; and
determining a device compatibility using at least the first device message;
sending a second encoded data stream the receiving entity if the an acknowledgement message is not received from the receiving entity within a predetermined period of time, the second encoded data stream including a second device message.

13. The method of claim 12 wherein the second encoded data stream is encoded in a second FEC mode.

14. The method of claim 12 further comprising processing the FEC mode message by the receiving entity.

15. The method of claim 14 further comprising decoding the first encoded data stream in the first FEC mode.

16. The method of claim 12 further comprising performing PAM modulation on the first encoded data stream.

17. The method of claim 12 further comprising embedding device identification information to a third region of the first alignment marker.

18. The method of claim 17 wherein the receiving entity determines a device compatibility based on the device identification information.

19. The method of claim 12 further comprising embedding the second device message in a second alignment marker.

20. The method of claim 12 wherein the second region comprises a BIP field.

* * * * *